US012723692B2

(12) United States Patent
Henker

(10) Patent No.: US 12,723,692 B2
(45) Date of Patent: Sep. 1, 2026

(54) MULTI-CONNECTOR

(71) Applicant: Illinois Tool Works Inc., Glenview, IL (US)

(72) Inventor: Michael Henker, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/533,520

(22) Filed: Dec. 8, 2023

(65) Prior Publication Data

US 2024/0200704 A1 Jun. 20, 2024

(30) Foreign Application Priority Data

Dec. 15, 2022 (CN) ........................ 202211613736.7
Dec. 1, 2023 (CN) ........................ 202311641464.6

(51) Int. Cl.
*F16L 37/56* (2006.01)
*F16L 39/00* (2006.01)

(52) U.S. Cl.
CPC ............... *F16L 37/56* (2013.01); *F16L 39/00* (2013.01)

(58) Field of Classification Search
CPC .......... F16L 37/56; F16L 37/088; F16L 39/00
USPC ............. 285/124.1, 124.2, 124.3, 124.4, 321
See application file for complete search history.

(56) References Cited

U.S. PATENT DOCUMENTS 4,754,993 A * 7/1988 Kraynick ................ F16L 37/56 285/915
5,271,646 A * 12/1993 Allread ................... F16L 37/56 285/305
5,332,268 A * 7/1994 Godeau ................... F16L 37/56 285/305
5,860,677 A * 1/1999 Martins ................... F16L 37/56 285/914
5,865,474 A * 2/1999 Takahashi ............... F16L 37/56 285/124.1
6,607,217 B2 * 8/2003 Patterson ............ F15B 13/0807 285/124.1
7,083,202 B2 * 8/2006 Eberle ................... F16L 37/088 285/321

(Continued)

*Primary Examiner* — David Bochna
(74) *Attorney, Agent, or Firm* — McAndrews, Held & Malloy, Ltd.

(57) ABSTRACT

Disclosed is a multi-connector for connecting a plurality of fluid channel ports provided on at least one device to a plurality of to-be-connected channels. The multi-connector includes a plurality of connectors and a connecting frame. The plurality of connectors are configured for connecting the plurality of fluid channel ports to the plurality of to-be-connected channels. Each of the plurality of connectors has a device connecting port and a to-be-connected channel connecting port. The connecting frame is configured to support the plurality of connectors. The device connecting port of each of the plurality of connectors is configured to be connected to a respective one of the plurality of fluid channel ports on the at least one device. The to-be-connected channel connecting port of each of the plurality of connectors is configured to be connected to a respective one of the plurality of to-be-connected channels. The layout pattern of the device connecting ports of the plurality of connectors on the connecting frame matches the layout pattern of the plurality of fluid channel ports on the at least one device.

16 Claims, 7 Drawing Sheets

(56) References Cited

U.S. PATENT DOCUMENTS

| | | | | |
|---|---|---|---|---|
| 8,801,046 B2 * | 8/2014 | Shinoda | F16L 39/00 | 285/124.1 |
| 8,991,872 B2 * | 3/2015 | Mahrenholz | F16L 39/00 | 285/19 |
| 2003/0146619 A1 * | 8/2003 | Souvatzidis | F16L 37/56 | 285/305 |
| 2009/0232585 A1 * | 9/2009 | Gilbreath | F16L 37/56 | 403/14 |
| 2015/0354736 A1 * | 12/2015 | Krupa | F16L 37/086 | 285/321 |

* cited by examiner

MULTI-CONNECTOR

RELATED APPLICATIONS

The present disclosure claims the benefit of Chinese Patent Application Nos. 2022116137367 filed Dec. 15, 2022, and 2023116414646, filed Dec. 1, 2023, each titled "Multi-Connector," the contents of which are hereby incorporated by reference.

TECHNICAL FIELD

This disclosure relates generally to connectors for fluid connections, and more specifically to connectors for fluidly connecting pipes in a vehicle.

BACKGROUND

Connectors, which are used to fluidly connect pipes, are widely used in thermal management systems for vehicles (including fuel vehicles, new energy vehicles (NEVs), and battery electric vehicles (BEVs) and so on). The existing connector is usually a tubular member that includes a connecting channel. In the thermal management system of a vehicle, a connector can connect various thermal management devices to the pipes that are connected to the vehicle parts to be cooled/heated, to form fluid paths, and thus form circulating paths for the cooling medium (e.g., coolant).

The current development toward NEVs, especially BEVs, involves significant changes in vehicle assembly by original equipment manufacturers (OEMs). For conventional internal combustion engine vehicles, most of the fluid connections are done at the engine and thus these fluid connections occur outside the vehicle, leaving only a few fluid connections to be done in the restricted space environment inside the vehicle. In BEVs, however, most of the fluid connections are done within the restricted space of the vehicle, and these fluid connections are in close proximity to each other. In the prior art, each fluid connection is assembled using a separate connector that is capable of connecting and locking two mating pipes together.

SUMMARY

The present disclosure relates generally to a multi-connector, substantially as illustrated by and described in connection with at least one of the figures, as set forth more completely in the claims. In one example, the present disclosure relates to a multi-connector for connecting a plurality of fluid channel ports.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
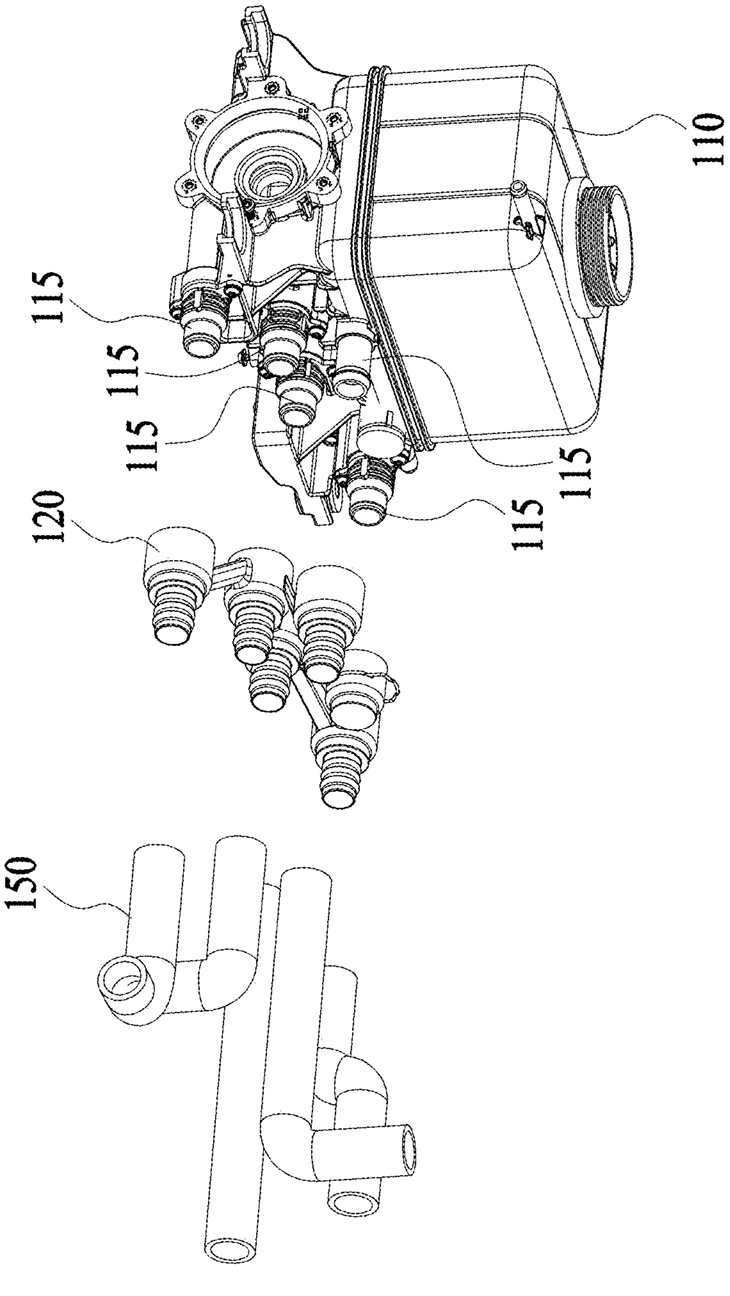
FIG. 1 is a perspective view of a multi-connector according to a first embodiment of the present disclosure, as well as a device and to-be-connected channels for use in conjunction therewith.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The inventors of the present disclosure have found that the existing way of using a separate connector for assembling of each fluid connection has the following technical problems. Since the fluid connections are close to each other, they are prone to misassembly. Even if misassembly is intended to be avoided by means of setting up assembly markings (e.g., by adding a number or a color), the effect achieved is insufficient, since these assembly markings can easily be shifted or removed, which increases the assembly time. In addition, the fact that the operator is required to perform multiple assemblies in order to assemble a separate connector for each fluid connection results in the first assembled connector taking up space, which affects the assembly operation of the later assembled connector.

The present disclosure provides a multi-connector for connecting a plurality of fluid channel ports provided on at least one device to a plurality of to-be-connected channels. The multi-connector comprises a plurality of connectors and a connecting frame. The plurality of connectors are configured for connecting the plurality of fluid channel ports to the plurality of to-be-connected channels. Each of the plurality of connectors has a device connecting port and a to-be-connected channel connecting port. The connecting frame is configured to support the plurality of connectors. The device connecting port of each of the plurality of connectors is configured to be connected to a respective one of the plurality of fluid channel ports on the at least one device. The to-be-connected channel connecting port of each of the plurality of connectors is configured to be connected to a respective one of the plurality of to-be-connected channels. The layout pattern of the device connecting ports of the plurality of connectors on the connecting frame matches the layout pattern of the plurality of fluid channel ports on the at least one device.

The multi-connector according to the above, the layout pattern includes the extending length arrangement of the device connecting ports of the plurality of connectors on the connecting frame, which matches the extending length arrangement of the plurality of fluid channel ports on the at least one device.

The multi-connector according to the above further comprises a frame locking mechanism configured to lock the connecting frame to the at least one device to retain connection of the device connecting port of the plurality of connectors to a corresponding fluid channel port on the at least one device.

The multi-connector according to the above, the frame locking mechanism is provided on the connecting frame and is independent of the plurality of connectors, or the frame locking mechanism is provided on one of the plurality of connectors.

The multi-connector according to the above, the frame locking mechanism is configured to be coupled to a device locking mechanism provided on the at least one device.

The multi-connector according to the above, the frame locking mechanism and the device locking mechanism form a clip-type locking device or a bayonet-type locking device.

The multi-connector according to the above, each of the plurality of connectors is a connecting tube or pipe, and each of the plurality of to-be-connected channels is a hose or pipe.

The multi-connector according to the above, the connecting frame is made of a rigid material or a semi-rigid material.

The multi-connector according to the above, the connecting frame is integrally formed with the plurality of connectors.

The multi-connector according to the above, the at least one device is an Integrated Thermal Module or comprises multiple devices that are in close proximity.

Embodiments of the present disclosure relate to a multi-connector that allows fluid connections at multiple positions to be accomplished by a single assembly operation.

FIG. 1 a perspective view of a multi-connector 120 according to a first embodiment of the present disclosure, as well as a device and to-be-connected channels for use in conjunction therewith. FIG. 1 shows an exemplary use environment of the multi-connector 120, in which the multi-connector 120 is used for fluid connection between a device 110, which is an Integrated Thermal Module (ITM), and a plurality of to-be-connected channels 150. The ITM is integrated with several related parts (e.g., various valves) for thermal management, and has a plurality of fluid channels. In one disclosure of the ITM, the ITM is connected via a plurality of to-be-connected channels 150 to vehicle components including a compressor, an interior condenser, a battery, and other vehicle components for a variety of functions such as battery cooling, air conditioning, and refrigeration, and the like. The to-be-connected channels 150 are, for example, hoses or other types of pipes. As shown in FIG. 1, the device 110 is provided with a plurality of fluid channel ports 115 (there are five shown in the figure), and the number of the to-be-connected channels 150 corresponds to the number of the fluid channel ports 115. The multi-connector 120 is used to fluidly connect the to-be-connected channels 150 to the fluid channel ports 115, respectively.

In the embodiment shown in FIG. 1, each fluid channel port 115 on the device 110 is a tubular portion, which may be mounted to the device 110, for example, by fasteners, and is in fluid communication with the device 110.

Figure 2A:
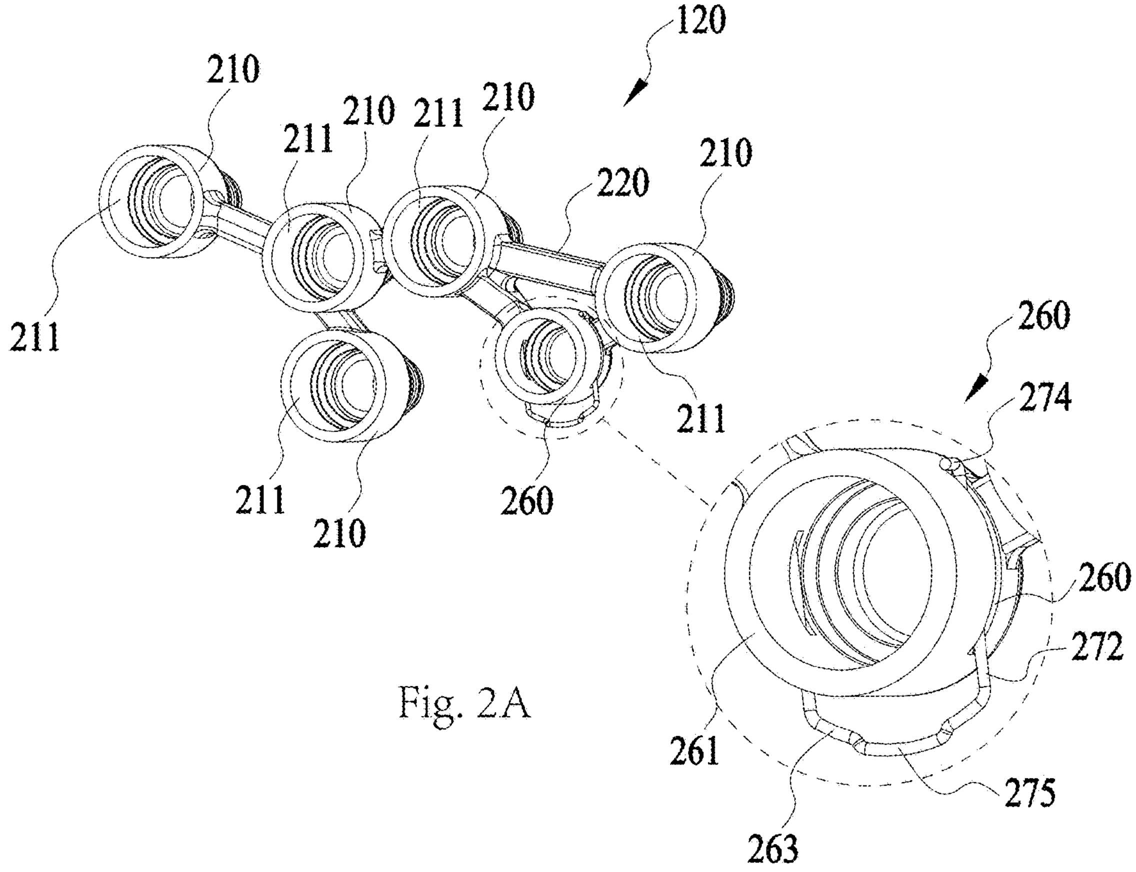
FIG. 2A is a front perspective view of the multi-connector of FIG. 1.
Figure 2B:
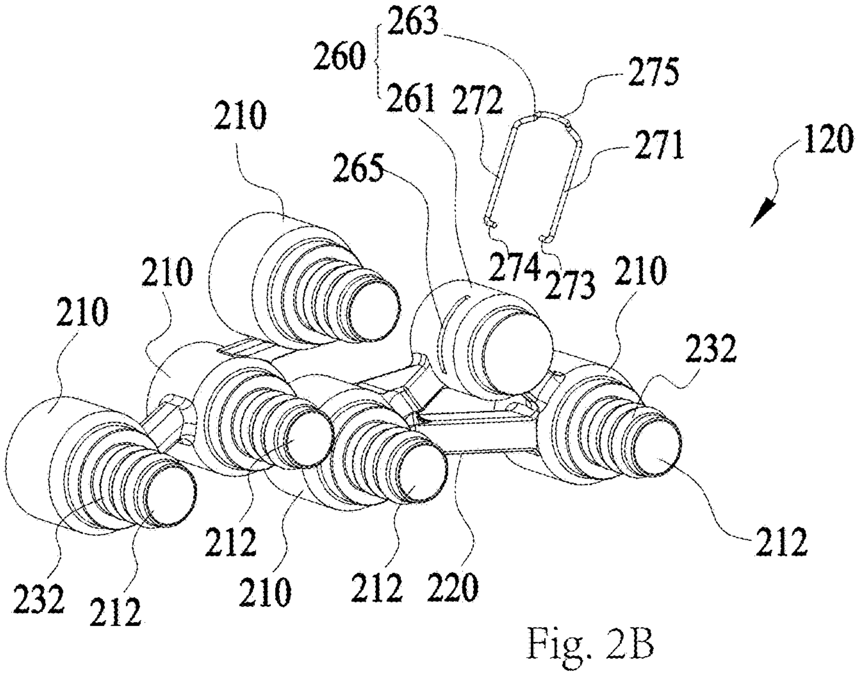
FIG. 2B is an exploded view of the multi-connector shown in FIG. 2A.

FIGS. 2A and 2B illustrate the specific structure of the multi-connector 120 of FIG. 1, among which FIG. 2A is a front perspective view of the multi-connector 120, and FIG. 2B is an exploded view of the multi-connector 120. As shown in FIGS. 2A and 2B, the multi-connector 120 comprises five connectors 210, a connecting frame 220, and a frame locking mechanism 260. The connecting frame 220 is made of a rigid or semi-rigid material (such as metallic materials, plastic materials, or mixtures thereof), which is not easy to be deformed. The connecting frame 220 supports the connectors 210 and the frame locking mechanism 260. In some embodiments, the connectors 210 are formed integrally with the connecting frame 220. In some embodiments, the connectors 210 are made separately from the connecting frame 220 and then assembled to the connecting frame 220. For embodiments in which the connectors 210 are made separately from the connecting frame 220, the connectors 210 are fixedly assembled on the connecting frame 220, but due to the presence of assembly tolerances, the connectors 210 may have a small amount of movement with respect to the connecting frame 220 that is within the assembly tolerances. However, without regard to the assembly tolerances, the connectors 210 are immovable relative to the connecting frame 220.

Each connector 210 is substantially in the shape of a connecting tube or pipe and has a device connecting port 211 and a to-be-connected channel connecting port 212 opposite each other. Fluid can flow in and out of the connect 210 from the device connecting port 211 and the to-be-connected channel connecting port 212. In the embodiment shown in FIGS. 2A and 2B, the device connecting port 211 forms a female end that is sized to be able to receive a corresponding one of the fluid channel ports 115 on the device 110. The to-be-connected channel connecting port 212 forms a male end that is sized to be able to be received by a corresponding one of the to-be-connected channels 150. Therefore, the connector 210 can fluidly connect each fluid channel port 115 to its corresponding to-be-connected channel 150. Of course, in other embodiments, the device connecting port 211 may also form a male end and the to-be-connected channel connecting port 212 forms a female end. Furthermore, in the embodiment shown in FIGS. 2A and 2B, the to-be-connected channel connecting port 212 is threaded to the to-be-connected channel 150. For this purpose, the to-be-connected channel connecting port 212 is provided with external threads 232, and the to-be-connected channel 150 is provided with matching internal threads (not shown).

In the embodiment shown in FIGS. 2A and 2B, the connecting frame 220 includes several connecting strips that connect the five connectors 210 two-by-two. The layout pattern of the device connecting ports 211 of the five connectors 210 on the connecting frame 220 matches the layout pattern of the five fluid channel ports 115 on the device 110 to enable the device connecting port 211 of each of the connectors 210 to form a fluid connection at a corresponding fluid channel port 115. The layout pattern of the device connecting ports 211 of the five connectors 210 on the connecting frame 220 includes not only the relative position arrangement of the device connecting ports 211 of the five connectors 210 with respect to each other but also their extending length arrangement on the connecting frame 220 that matches the extending length arrangement of the fluid channel ports 115 from the device 110. As a result, the multi-connector 120 can form fluid connections at a plurality of positions based on the number of connectors 210, with each connector 210 corresponding to a fluid connection position.

The frame locking mechanism 260 is used to lock the connecting frame 220 to the device 110. Since the plurality of connectors 210 are generally fixedly connected to the connecting frame 220, the plurality of connectors 210 cannot move relative to the device 110 when the connecting frame 220 is locked to the device 110, and therefore the connection state between the device connecting port 211 of the plurality of connectors 210 and the corresponding fluid channel port 115 can be retained, which allows the device connecting port 211 of the plurality of connectors 210 and the corresponding fluid channel port 115 also to be "locked" relative to each other. That is, by using a frame locking mechanism 260 to lock the connecting frame 220 to the device 110, the whole multi-connector 120 can be locked to the device 110. The frame locking mechanism 260 is coupled to a device locking mechanism 360 (shown in FIG. 3) provided on the device 110 to form a locking means therewith. In the embodiment shown in FIGS. 2A and 2B, the locking means is a clip-type locking device, and in other embodiments, the locking means may be of other types.

Specifically, as shown in FIG. 2A, the frame locking mechanism 260 includes a tubular body 261 and a latch member 263. The body 261 forms a passageway 262, and the body 261 is provided with an opening 265 that receives the latch member 263. The opening 265 is connected with the passageway 262. The latch member 263 is capable of at least partially passing through the opening 265 into the passageway 262 and is capable of exiting the passageway 262 when pushed by the device locking mechanism 360. In the illustrated embodiments, the body 261 of the frame locking mechanism 260, and the plurality of connectors 210 are integrally formed with the connecting strips of the connecting frame 220 so that the body 261 of the frame locking mechanism 260 and the plurality of connectors 210 are secured to the connecting frame 220 and cannot move relative to the connecting frame 220. In some embodiments, the body 261 of the frame locking mechanism 260 is made separately from the connecting frame 220 and then fixedly assembled on the connecting frame 220, but due to the presence of assembly tolerances, the body 261 of the frame locking mechanism 260 may have a small amount of movement with respect to the connecting frame 220 that is within the assembly tolerances. However, without regard to the assembly tolerances, the body 261 of the frame locking mechanism 260 is immovable relative to the connecting frame 220.

Still as shown in FIGS. 2A and 2B, the latch member 263 of the frame locking mechanism 260 is substantially U-shaped. The latch member 263 comprises a pair of arms 271, 272 and a head 275 which connects the pair of arms 271, 272 to each other and forms an operation portion of the latch member 263. The pair of arms 271, 272 of the U-shaped latch member 263 are capable of being opened with respect to each other and of being restored to an initial position, making the latch member 263 resilient. Proximal ends of the pair of arms 271, 272 are attached to the head 275 and distal ends thereof are provided with foot portions 273, 274, each of which forms a bent shape together with a corresponding arm 271, 272. The foot portions 273, 274 are used to cooperate with an outer surface of the body 261 of the frame locking mechanism 260 to hold the distal ends of the pair of arms 271, 272 of the latch member 263 outside of the channel 262, and to be able to cause the pair of arms 271, 272 of the latch member 263 to be opened relative to each other for unlocking functionality.

Figure 3:
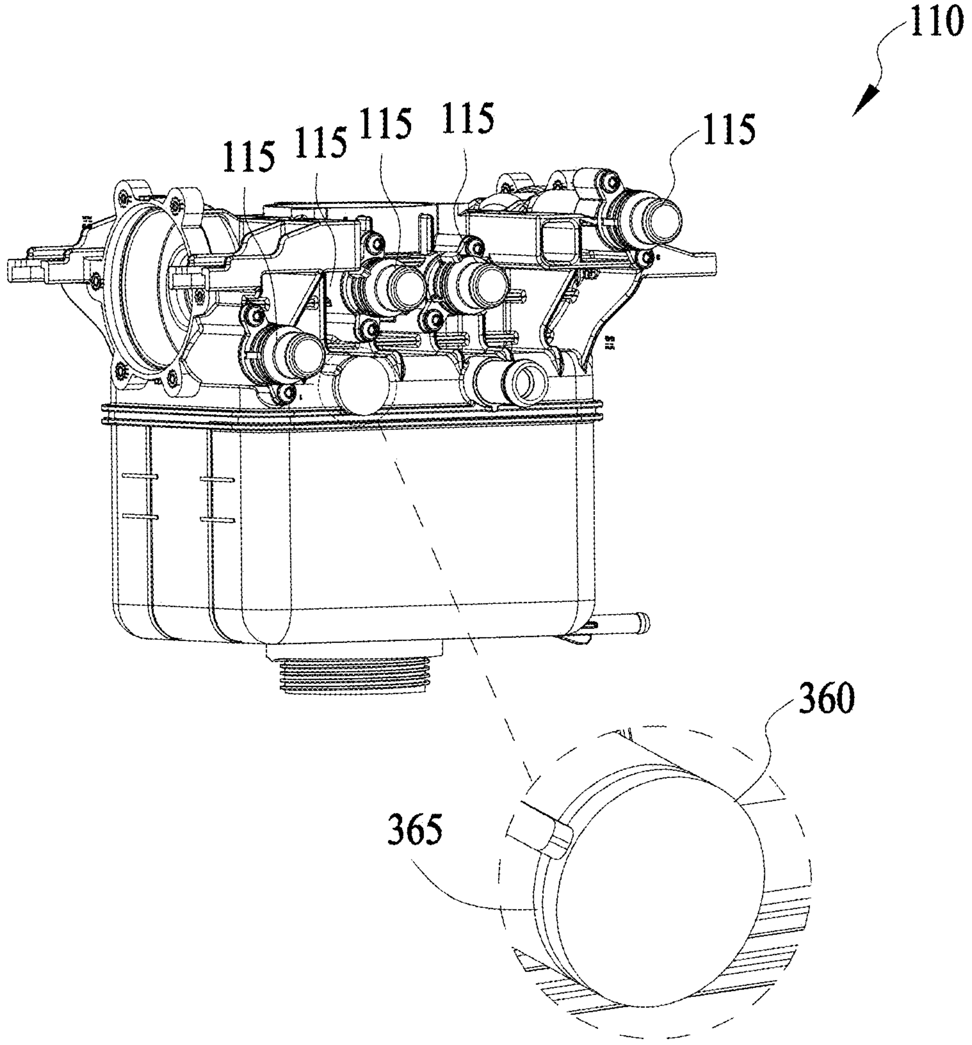
FIG. 3 is a perspective view of the device shown in FIG. 1.

FIG. 3 illustrates the specific structure of the device locking mechanism 360. As shown in FIG. 3, the device locking mechanism 360 is substantially in the shape of a cylinder and is provided with a receiving groove 365 extending along a circumferential direction on an outer surface thereof. The receiving groove 365 is configured to cooperate with the latching member 263 to couple the frame locking mechanism 260 with the device locking mechanism 360, or to make the two decoupled, thereby enabling locking and unlocking between the connecting frame 220 and the device 110.

Specifically, in the process of coupling the frame locking mechanism 260 with the device locking mechanism 360, when the device locking mechanism 360 is inserted into the passageway 262 of the frame locking mechanism 260, the cylinder outer surface of the device locking mechanism 360 can push the pair of arms 271, 272 of the latch member 263 in the passageway 262 outwardly, causing the pair of arms 271, 272 to leave the passageway 262. When the receiving slot 365 on the device locking mechanism 360 is aligned with the opening 265 on the body 261 of the frame locking mechanism 260, the pair of arms 271, 272 of the latch member 263 return to the passageway 262 via the opening 265 by elastic force and enter the receiving slot 365 on the device locking mechanism 360, whereby the latch member 263 couple the frame locking mechanism 260 and the device locking mechanism 360 in place relative to each other, and thereby the frame locking mechanism 260 and the device locking mechanism 360 lock the multi-connector 120 to the device 110.

During the process of decoupling the frame locking mechanism 260 from the device locking mechanism 360, an operator pulls the latch member 263 through the head 275 of the latch member 263, causing the pair of arms 271, 272 of the latch member 263 to open with respect to each other and leave the receiving slot 365 on the device locking mechanism 360, thereby decoupling the frame locking mechanism 260 from the device locking mechanism 360. As a result, the multi-connector 120 is no longer locked to the device 110, but can be detached from the device 110.

Figure 4A:
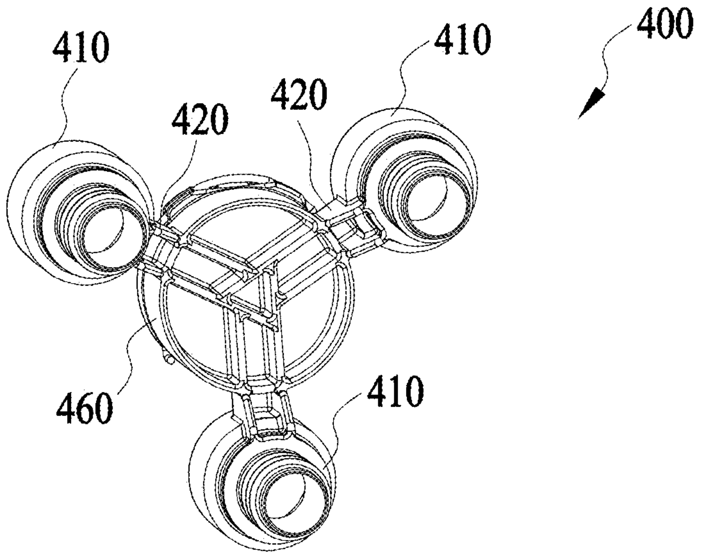
FIG. 4A is a front perspective view of a multi-connector according to a second embodiment of the present disclosure.
Figure 4B:
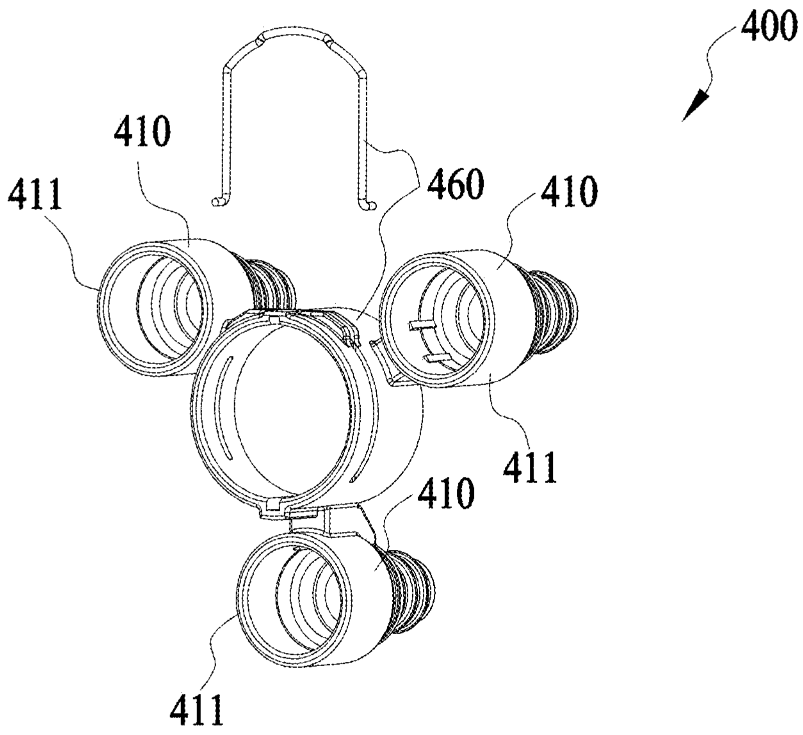
FIG. 4B is an exploded view of the multi-connector shown in FIG. 4A.

FIGS. 4A and 4B illustrate a multi-connector 400 according to a second embodiment of the present disclosure, among which FIG. 4A is a front perspective view of the multi-connector 400 and FIG. 4B is an exploded view of the multi-connector 400. The multi-connector 400 shown in FIGS. 4A and 4B also includes a plurality of connectors 410, a connecting frame 420, and a frame locking mechanism 460. The multi-connector 400 shown in FIGS. 4A and 4B is similar to the multi-connector 120 shown in FIGS. 2A and 2B in the structure of the connectors and the structure of the frame locking mechanism, and will not be described herein. However, the number of connectors 410 and the layout pattern of the device connecting ports 411 of the multi-connector 400 are different from the number of connectors 210 and the layout pattern of the device connecting ports 211 of the multi-connector 120. The multi-connector 400 comprises three connectors 410, which connectors 410 and the device connecting ports 411 thereof are uniformly arranged around the frame locking mechanism 460. In addition, the connecting frame 420 of the multi-connector 400 includes three connecting strips that converge with each other and extend into the body 461 of the frame locking mechanism 460.

Figure 5A:
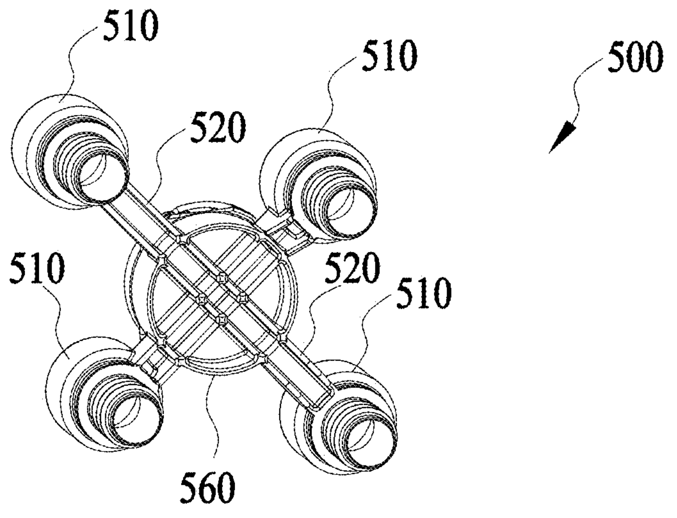
FIG. 5A is a front perspective view of a multi-connector according to a third embodiment of the present disclosure.
Figure 5B:
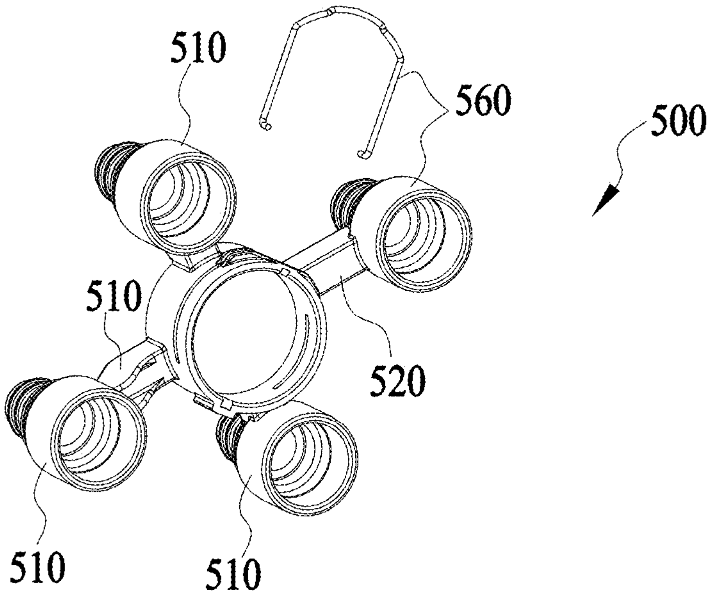
FIG. 5B is an exploded view of the multi-connector shown in FIG. 5A.

FIGS. 5A and 5B illustrate a multi-connector 500 according to a third embodiment of the present disclosure, among which FIG. 5A is a front perspective view of the multi-connector 500, and FIG. 5B is an exploded view of the multi-connector 500. The multi-connector 500 shown in FIGS. 5A and 5B is similar to the multi-connector 400 shown in FIGS. 4A and 4B, which also includes a plurality of connectors 510, a connecting frame 520, and a frame locking mechanism 560, and the only difference is that the number of connectors 510 of the multi-connector 500 is four.

Figure 6A:
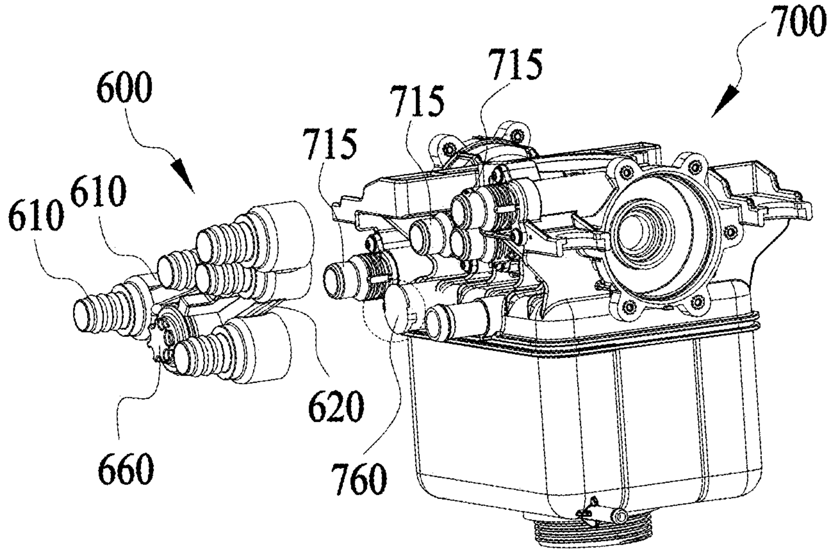
FIG. 6A is a perspective view of a multi-connector according to a fourth embodiment of the present disclosure and a device for use in conjunction therewith.

FIG. 6A illustrates a multi-connector 600 according to a fourth embodiment of the present disclosure and a device 700 for use in conjunction therewith. As shown in FIG. 6A, the multi-connector 600 also includes a plurality of connectors 610, a connecting frame 620, and a frame locking mechanism 660, and the device 700 includes a plurality of fluid channel ports 715 and a device locking mechanism 760, with the frame locking mechanism 660 and the device locking mechanism 760 together form a locking means. The structure of the multi-connector 600 is generally similar to the structure of the multi-connector 120 shown in FIGS. 2A and 2B, differing only in that the locking means formed by the frame locking mechanism 660 of the multi-connector 600 and the device locking mechanism 760 of the device 700 is a bayonet-type locking device, while the locking means formed by the frame locking mechanism 260 of the multi-connector 120 and the device locking mechanism 360 of the device 100 is a clip-type locking device.

Figure 6B:
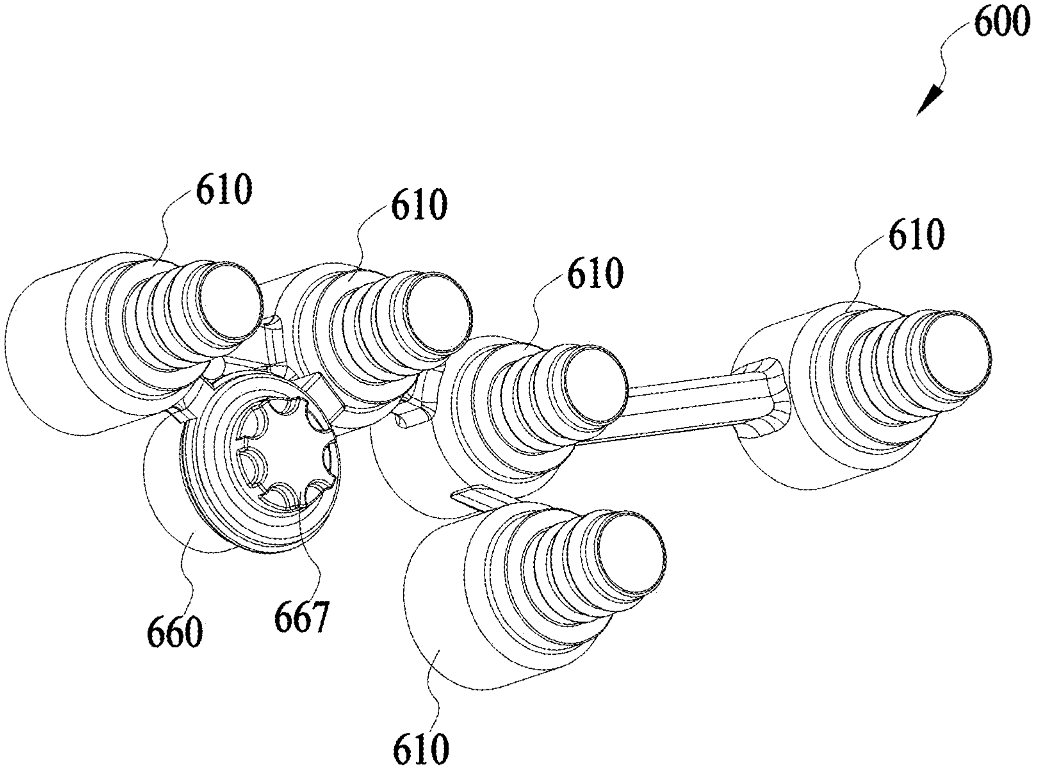
FIG. 6B is a perspective view of the multi-connector shown in FIG. 6A from a first perspective.
Figure 6C:
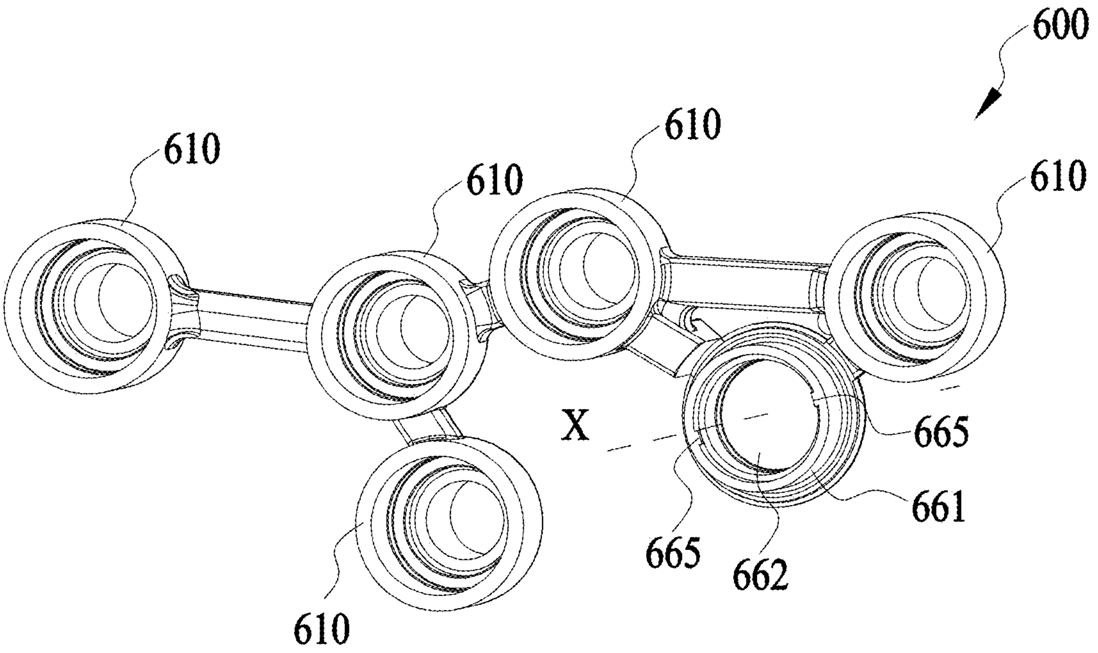
FIG. 6C is a perspective view of the multi-connector shown in FIG. 6A from a second perspective.

FIGS. 6B and 6C illustrate the specific structure of the multi-connector 600 from two different views, respectively. As shown in FIGS. 6B and 6C, the frame locking mechanism 660 of the multi-connector 600 includes a tubular body 661. The body 661 forms a passageway 662 that receives the device locking mechanism 760 through its rear end. The frame locking mechanism 660 is rotatably mounted to the connecting frame 620 about the axis X of the body 661, but the frame locking mechanism 660 cannot move along the axis X of the body 661 relative to the connecting frame 620. The frame locking mechanism 660 further includes a pair of connecting projections 665 provided on an inner wall of the main body 661 at the rear end of the passageway 662. The pair of connecting projections 665 are symmetrical with respect to the axis X of the main body 661. In addition, the frame locking mechanism 660 further includes an operating portion 667 provided at a distal end of the main body 661, by which an operator can rotate the frame locking mechanism 660 with respect to the connecting frame 620 to realize coupling and decoupling between the frame locking mechanism 660 and the device locking mechanism 760.

Figure 6D:
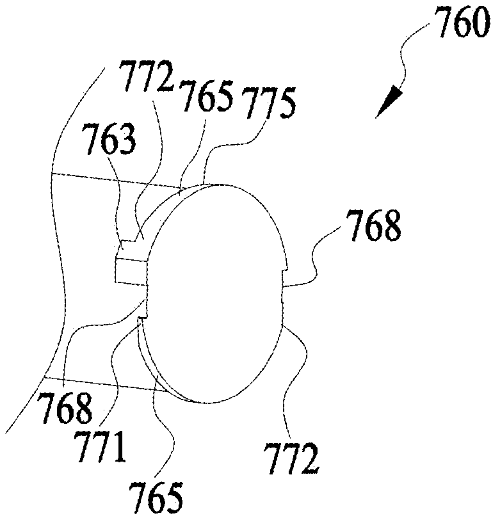
FIG. 6D is a partial perspective view of a device locking mechanism of the device shown in FIG. 6A.

FIG. 6D illustrates the specific structure of the device locking mechanism 760 of the device 700. The device locking mechanism 760 is substantially cylindrical and is provided with a pair of connecting flanges 765 extending in a circumferential direction on the outer surface of the front end thereof. Each connecting flange 765 has a proximal end 771 and a distal end 772, and the connecting flange 765 becomes progressively thicker from the proximal end 771 to the distal end 772 thereof, such that a rear side surface 775 of the connecting flanges 765 forms a section of helical surface that extends around the axis of the device locking mechanism 760. The device locking mechanism 760 also includes a stop portion 763 provided at the distal end 772 of each connecting flange 765. The stop portion 763 extends from the rear side surface 775 of the connecting flange 765. In addition, the device locking mechanism 760 further includes an opening 768 provided between the proximal end 771 (or the distal end 772) of one connecting flange 765 and the distal end 772 (or the proximal end 771) of the other connecting flange 765 for receiving the connecting projection 665 of the frame locking mechanism 660.

When locking the multi-connector 600 to the device 700 by the frame locking mechanism 660 and the device locking mechanism 760, the connecting projections 665 on the frame locking mechanism 660 are first aligned with the openings 768 on the device locking mechanism 760, and then the device locking mechanism 760 is inserted into the passageway 662 of the frame locking mechanism 660 until the connecting projections 665 moves past the connecting flanges 765. Subsequently, the frame locking mechanism 660 is rotated so that the connecting projections 665 thereof moves at the rear side of the connecting flange 765 along the rear side surface 775 of the connecting flange 765 until it is blocked by the stop portion 763 and cannot be rotated any further. As a result, the frame locking mechanism 660 and the device locking mechanism 760 are coupled to each other, and thus, the locking means formed by both locks the multi-connector 600 to the device 700.

When the multi-connector 600 is unlocked from the device 700 by the frame locking mechanism 660 and the device locking mechanism 760, the frame locking mechanism 660 is rotated in a direction opposite to the direction described above until the connecting projections 665 are aligned with the openings 768. Subsequently, the frame locking mechanism 660 and the device locking mechanism 760 can be decoupled, and thereby, the multi-connector 600 can be unlocked and detached from the device 700.

Since the multi-connector of the present disclosure is provided with a plurality of connectors that are retained generally immovable with respect to each other, and the layout pattern of the device connecting ports of the plurality of connectors on the connecting frame matches the layout pattern of the fluid channel ports on the device, fluid connections at multiple positions can be accomplished in a single operation so that the multi-connector of the present disclosure can be well suited for the use in environments where the space for assembling is constricted. In addition, there is no misassembly and the assembly time is greatly reduced. Furthermore, since the plurality of connectors of the multi-connector of the present disclosure are supported on the connecting frame in a way that they are retained generally immovable with respect to each other, the present disclosure can maintain the connection state of the device connecting ports of the plurality of connectors to the fluid connecting ports of the device at the same time by simply locking the frame onto the device using a frame locking device, so that the structure of the multi-connector of the present disclosure is easy to realize the assembling and disassembling, and the assembling force required to be exerted by an operator can be reduced as well.

It should be noted that although the device shown in the drawings is a single Integrated Thermal Module device, in other applications of the present disclosure, the multi-connector of the present disclosure may also be used for fluid connection between more than one device and the to-be-connected channel, which more than one device is typically in close proximity to each other and thus in a constricted assembly operation space. Although in embodiments of the present disclosure, the frame locking mechanism is provided independent of the plurality of connectors, in other embodiments the frame locking mechanism may also be provided on one of the plurality of connectors, which may be accomplished by using the connector as the body of the frame locking mechanism and adding a latch member. In such embodiments, the device locking mechanism is provided on one of the device connecting ports that will be interconnected with the connector for which the frame locking mechanism is provided. In addition, the locking means of the multi-connector of the present disclosure may also be other types of locking devices other than the clip-type and the bayonet-type, which are within the scope of protection of the present disclosure.

Although the present disclosure has been described with reference to the examples of embodiments stated above, various alternatives, modifications, variations, improvements, and/or substantially equivalent solutions, whether known or now or foreseeable in the near future, may be apparent to those of at least ordinary skill in the art. Furthermore, the technical effects and/or technical problems described in this specification are exemplary and not limiting; so, the disclosures in this specification may be used to solve other technical problems and have other technical effects and/or can solve other technical problems. Thus, the examples of embodiments of the present disclosure as stated above are intended to be illustrative and not limiting. Various changes may be made without departing from the spirit or scope of the present disclosure. Accordingly, the present disclosure is intended to include all known or earlier developed alternatives, modifications, variations, improvements and/or substantially equivalent solutions.

What is claimed is:

1. A multi-connector for connecting a plurality of fluid channel ports provided on at least one device to a plurality of to-be-connected channels, the multi-connector comprising:

- a plurality of connectors for connecting the plurality of fluid channel ports to the plurality of to-be-connected channels, each of the plurality of connectors having a device connecting port and a to-be-connected channel connecting port;
- a connecting frame for supporting the plurality of connectors; and
- a frame locking mechanism configured to lock the connecting frame to the at least one device to retain connection of the device connecting port of the plurality of connectors to a corresponding fluid channel port on the at least one device,
  - wherein the device connecting port of each of the plurality of connectors is configured to be connected to a respective one of the plurality of fluid channel ports on the at least one device,
  - wherein the to-be-connected channel connecting port of each of the plurality of connectors is configured to be connected to a respective one of the plurality of to-be-connected channels,
  - wherein a layout pattern of the device connecting ports of the plurality of connectors on the connecting frame is arranged in a non-collinear arrangement that matches a layout pattern of the plurality of fluid channel ports on the at least one device,
  - wherein the multi-connector is detachable from the plurality of fluid channel ports,
  - wherein each of the plurality of connectors comprises a periphery,
  - wherein the connecting frame comprises a plurality of strips, and
  - wherein each strip comprises one end that does not extend around an entirety of the periphery of a corresponding connector.

2. The multi-connector of claim 1, wherein:
the layout pattern of the device connecting ports includes an extending length arrangement of the device connecting ports of the plurality of connectors on the connecting frame, which matches an extending length arrangement of the plurality of fluid channel ports on the at least one device.

3. The multi-connector of claim 1, wherein:
the frame locking mechanism is configured to be coupled to a device locking mechanism provided on the at least one device.

4. The multi-connector of claim 3, wherein:
the frame locking mechanism and the device locking mechanism form a clip-type locking means or a bayonet-type locking means.

5. The multi-connector of claim 1, wherein:
each of the plurality of connectors is a connecting tube or pipe, and
wherein each of the plurality of to-be-connected channels is a hose or pipe.

6. The multi-connector of claim 1, wherein:
the connecting frame is made of a rigid material or a semi-rigid material.

7. The multi-connector of claim 1, wherein:
the connecting frame is integrally formed with the plurality of connectors.

8. The multi-connector of claim 1, wherein:
the at least one device is an Integrated Thermal Module (ITM) or comprises multiple devices that are in close proximity.

9. A multi-connector for connecting a plurality of fluid channel ports provided on at least one device to a plurality of to-be-connected channels, the multi-connector comprising:

- a plurality of connectors for connecting the plurality of fluid channel ports to the plurality of to-be-connected channels, wherein each of the plurality of connectors includes a device connecting port configured to connect to a respective one of the plurality of fluid channel ports and a to-be-connected channel connecting port configured to connect to a respective one of the plurality of to-be-connected channels;

a connecting frame for supporting the plurality of connectors, wherein the plurality of connectors comprises three connectors having their device connecting ports arranged to define a non-collinear layout pattern that corresponds to a layout pattern of the plurality of fluid channel ports or a portion thereof; and a frame locking mechanism configured to lock the connecting frame to the at least one device to retain connection of the device connecting port of the plurality of connectors to a corresponding fluid channel port on the at least one device, wherein the multi-connector is detachable from the plurality of fluid channel ports, wherein each of the plurality of connectors comprises a periphery, wherein the connecting frame comprises a plurality of strips, and wherein each strip comprises one end that does not extend around an entirety of the periphery of a corresponding connector.

10. The multi-connector of claim 9, wherein the connecting frame is integrally formed with the plurality of connectors using a rigid or a semi-rigid plastic material.

11. The multi-connector of claim 9, wherein the plurality of connectors comprises more than three connectors.

12. The multi-connector of claim 9, wherein the non-collinear layout pattern includes an extending length arrangement of the device connecting ports of the plurality of connectors on the connecting frame that matches an extending length arrangement of the plurality of fluid channel ports on the at least one device.

13. The multi-connector of claim 9, wherein the frame locking mechanism is configured to be coupled to a device locking mechanism provided on the at least one device to form a clip-type lock or a bayonet-type lock.

14. The multi-connector of claim 9, wherein each of the plurality of connectors is a connecting tube or pipe, and wherein each of the plurality of to-be-connected channels is a hose or pipe.

15. A system comprising:

a device comprising a plurality of fluid channel ports arranged in a first non-collinear layout pattern; and a multi-connector comprising a plurality of connectors for connecting the plurality of fluid channel ports to a plurality of to-be-connected channels and a connecting frame integrally formed with the plurality of connectors, wherein each of the plurality of connectors includes a device connecting port configured to connect to a respective one of the plurality of fluid channel ports and a to-be-connected channel connecting port configured to connect to a respective one of the plurality of to-be-connected channels, wherein the device connecting port are arranged to define a second non-collinear layout pattern that matches the first non-collinear layout pattern, wherein the multi-connector comprises a frame locking mechanism configured to lock the connecting frame to the device to retain connection of the device connecting port of the plurality of connectors to a corresponding fluid channel port on the device, wherein the multi-connector is detachable from the plurality of fluid channel ports, wherein each of the plurality of connectors comprises a periphery, wherein the connecting frame comprises a plurality of strips, and wherein each strip comprises one end that does not extend around an entirety of the periphery of a corresponding connector.

16. The multi-connector of claim 15, wherein the device is an Integrated Thermal Module (ITM) or comprises multiple devices that are in close proximity.

* * * * *